N. W. Northrup,

Shaft Coupling,

N° 34,769. Patented Mar. 25, 1862.

Witnesses
J. S. B Mon
J. L. Hayis

Inventor
Nelson W Northrup

UNITED STATES PATENT OFFICE.

NELSON W. NORTHRUP, OF GREENE, NEW YORK.

IMPROVEMENT IN COUPLING SHAFTING AND RODS.

Specification forming part of Letters Patent No. 34,769, dated March 25, 1862.

*To all whom it may concern:*

Be it known that I, NELSON W. NORTHRUP, of the town of Greene, county of Chenango, State of New York, have invented a new and Improved Mode of Coupling Shafting and Rods; and I do hereby declare that the following is a full and complete description thereof, reference being had to the accompanying drawings, and to the letters of reference marked thereon.

The nature of my invention consists in making a coupling in two halves with ribs or flanges to hold the shafts in place, and also to take the place of a key or wedge to hold the coupling to the shaft to give them a joint motion.

To enable those skilled in the art to make and use my invention, I will proceed to describe its construction and operation.

Figure 2:
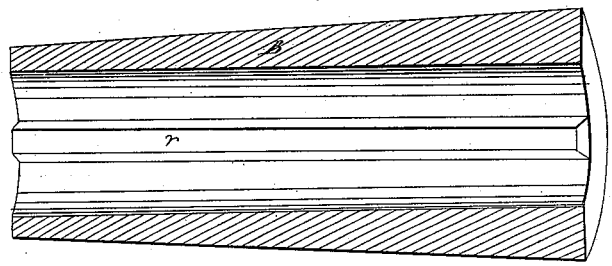
Figure 3:
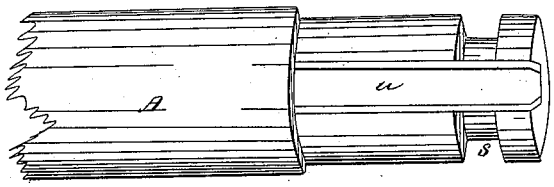
Figure 4:
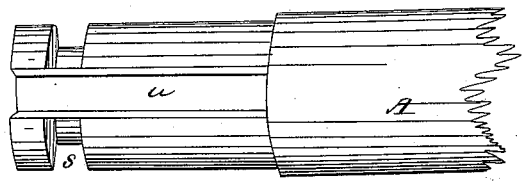
Figure 5:
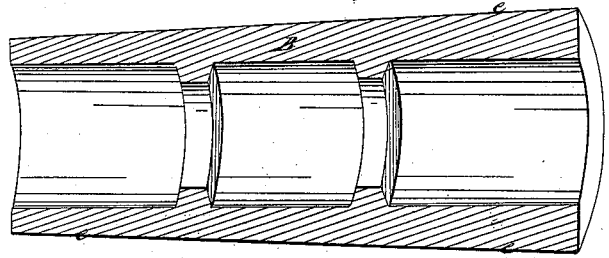

I make my coupling in two halves, as shown, Figures 2 and 3; B B $r$ $r$, Fig. 2, a rib or flange lengthwise of the coupling to fit in a corresponding groove or slot $u$ $u$ in the shafts A A. The other half, Fig. 3, I make with two cross ribs or flanges $x$ $x$ to fit the grooves $s$ $s$ in the shafts A A. The operation when closed together is to hold the shaft firmly from being drawn apart.

Figure 1:
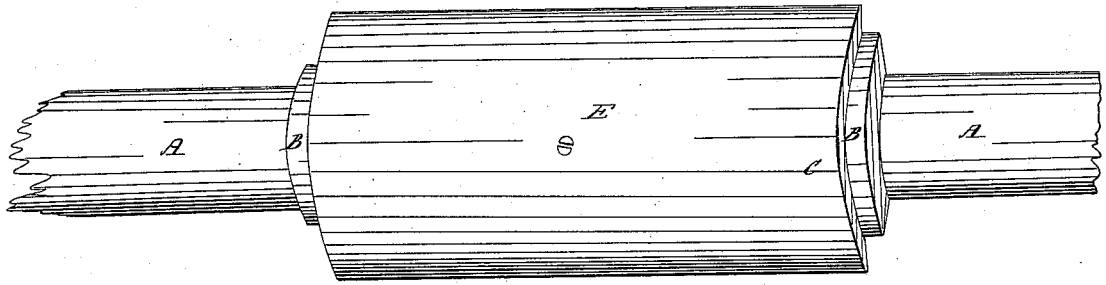

I make the coupling tapered on the outside, as shown by the lines $e$ $e$ $e$, and have a sleeve or band that fits it driven on firm, as in Fig. 1, G, in which is a set-screw; E, the seat below the surface, the point made to fit a countersink drilled into the coupling after the band is driven on firm to prevent it from working loose by use.

What I claim as my invention is—

The coupling made in two halves, as described, with the grooves, ribs, or flanges, and band or sleeve and set-screw, combined and for the purposes set forth.

NELSON W. NORTHRUP.

Witnesses:
 R. F. OSGOOD,
 WM. TRUSLOW BROWN.